United States Patent [19]

Ohta et al.

[11] Patent Number: 4,843,882
[45] Date of Patent: Jul. 4, 1989

[54] DIRECT-HEATED FLOW MEASURING APPARATUS HAVING IMPROVED SENSITIVITY RESPONSE SPEED

[75] Inventors: Minoru Ohta, Okazaki; Michitoshi Onoda, Toyohashi; Kazuhiko Miura, Nukata; Seizi Huzino, Anjo; Tadashi Hattori, Okazaki; Kenji Kanehara, Nukata; Masanori Fukutani, Nagoya, all of Japan

[73] Assignee: Nippon Soken, Inc., Nishio, Japan

[21] Appl. No.: 223,673

[22] Filed: Jul. 25, 1988

Related U.S. Application Data

[63] Continuation of Ser. No. 894,112, Aug. 7, 1986, abandoned.

[30] Foreign Application Priority Data

Aug. 13, 1985 [JP] Japan ................. 60-176843
May 15, 1986 [JP] Japan ................. 61-111191

[51] Int. Cl.$^4$ ............................ G01F 1/68
[52] U.S. Cl. ............................ 73/204.26
[58] Field of Search ............ 73/204, 204.26, 204.21

[56] References Cited

U.S. PATENT DOCUMENTS

| | | | |
|---|---|---|---|
| 3,975,951 | 8/1976 | Kohama et al. | |
| 4,279,146 | 7/1981 | Wessel et al. | |
| 4,294,114 | 10/1981 | Lauterbach | |
| 4,304,130 | 12/1981 | Peter et al. | |
| 4,448,070 | 5/1984 | Ohyama et al. | 73/204 |
| 4,542,650 | 9/1985 | Renken et al. | 73/204 |
| 4,548,078 | 10/1985 | Bohrer et al. | 73/204 |
| 4,624,138 | 11/1986 | Ono | 73/204 |
| 4,677,850 | 7/1987 | Miura et al. | 73/204 |
| 4,682,496 | 7/1987 | Miura et al. | 73/204 |
| 4,693,115 | 9/1987 | Tokura et al. | |
| 4,705,713 | 11/1987 | Ohta et al. | |

FOREIGN PATENT DOCUMENTS

| | | | |
|---|---|---|---|
| 0069253 | 1/1983 | European Pat. Off. | |
| 0147831 | 7/1985 | European Pat. Off. | |
| 14915 | of 1981 | Japan | |
| 1488012 | 10/1977 | United Kingdom | 73/204 |
| 2040471 | 8/1980 | United Kingdom | |
| 2040472 | 8/1980 | United Kingdom | |
| 2041536 | 9/1980 | United Kingdom | |
| 1586948 | 3/1981 | United Kingdom | |

*Primary Examiner*—Herbert Goldstein
*Attorney, Agent, or Firm*—Cushman, Darby & Cushman

[57] ABSTRACT

In a direct-heated flow measuring apparatus including a film resistor having a substrate supported by a supporting member in a passage, at least one face of the substrate on the upstream side thereof is sloped with respect to a fluid stream within the passage.

13 Claims, 8 Drawing Sheets

DIRECT-HEATED FLOW MEASURING APPARATUS HAVING IMPROVED SENSITIVITY RESPONSE SPEED

This is a continuation of application Ser. No. 06/894,112, filed Aug. 7, 1986, which was abandoned upon the filing hereof.

BACKGROUND OF THE INVENTION

1. Field of the Invention

The present invention relates to a direct-heated flow measuring apparatus havng a film resistor which serves as a temperature detecting means as well as an electric heater. Such a direct-heated flow measuring apparatus can be used, for example, for measuring the flow rate of engine intake air.

2. Description of the Related Art

Generally, in an internal combustion engine, the amount of intake air is one of the most important parameters for controlling the fuel injection amount, ignition timing, and the like. A flow measuring apparatus, i.e., an airflow meter, is provided for measuring the same. One of the more common prior art airflow meters is the vane-type, but this is disadvantageous in scale, response speed characteristics, and the like, and therefore, airflow meters having temperature-dependent resistors have been developed, in which these disadvantages of scale, response speed characteristics, and the like are avoided (see: U.S. Pat. No. 3975951).

There are two types of airflow meters having temperature-dependent resistors, i.e., the heater-type and direct-heated type. The heater-type airflow meter may consist of an electric heater resistor provided in an intake-air passage of an engine and two temperature-dependent resistors arranged on the upstream and downstream sides of the electric heater resistor. In this case, the temperature-dependent resistor on the downstream side is used for detecting the temperature of air heated by the heater resistor, while the temperature-dependent resistor on the upstream side is used for detecting the temperature of non-heated air. The current flowing through the heater resistor is controlled to proved a constant difference in temperature between the two temperature-dependent resistors, and thus the mass flow rate of air is determined by detecting the voltage applied to the heater resistor.

In this heater-type airflow meter, if an upstream temperature-dependent resistor is not provided and the current of the heater resistor is controlled to provide a constant temperature of the downstream temperature-dependent resistor, the voltage applied to the heater resistor is detected as representing the volume flow rate of air.

On the other hand, the direct-heated type airflow meter may consist of a film resistor which serves not only as an electric heater, but also as a temperature-detecting means for detecting the temperature of the heated air. Also, the direct-heated type airflow meter may consist of a temperature-dependent resistor for detecting the temperature of non-heated air. Thus, the current flowing through the film resistor is controlled to provide a constant difference in temperature between the film resistor and the temperature dependent resistor, thereby detecting the voltage applied to the film resistor as representing the mass flow rate of air. In this direct-heated type airflow meter, too, if a temperature-dependent resistor is not provided and the current of the heater resistor is controlled to provide a constant temperature of the film resistor, the voltage applied to the film resistor is detected as representing the volume flow rate of air.

Since the film resistor of the direct-heated type airflow meter serves as a temperature-detecting means for heated air, that is, an additional temperature detecting means for heated air is not necessary, the direct-heated type airflow meter is smaller in size than the heater-type airflow meter.

In the direct-heated type airflow meter, the film resistor may consist of an insulating substrate such as a ceramic substrate or monocrystalline silicon substrate, a resistance layer of platinum (Pt), gold (Au), etc. on the insulating substrate, and a heat-resistant resin on the resistance pattern. Here, it is impossible to burn off suspended particles (mainly, carbon particles) adhered to the boundary region and the stagnation region of the film resistor, since a temperature higher than 800° C. is required for such burn-off and the heat-resistant resin has a low melting temperature such as 400° C. Therefore, the suspended particles remain adhered to the film resistor, increasing the heat capacity and reducing the heat dissipation characteristics thereof, and therefore, reducing the sensitivity and response speed characteristics of the airflow meter. Also, where a heat-resistant resin is not provided for covering the film resistor, when such a burn-off is carried out, the film resistor is exposed to a temperature higher than 800° C., so that the resistance value of the film resistor is changed and a drift occurs in the output of the airflow sensor.

SUMMARY OF THE INVENTION

It is an object of the present invention to provide a direct-heated flow measuring apparatus maintaining the necessary sensitivity and response characteristics.

According to the present invention, in a direct-heated flow measuring apparatus including a film resistor having a substrate supported by a supporting member in a passage, the film resistor is in parallel to a fluid stream within the passage, and at least one face of the substrate is sloped with respect to the fluid stream. As a result, a boundary region or stagnation region is not generated at least on the upstream side of the film resistor, thus avoiding or suppressing the adhesion of suspended particles thereto.

BRIEF DESCRIPTION OF THE DRAWINGS

The present invention will be more clearly understood from the description as set forth below with reference to the accompanying drawing, wherein.

DESCRIPTION OF THE PREFERRED EMBODIMENTS

Figure 1:
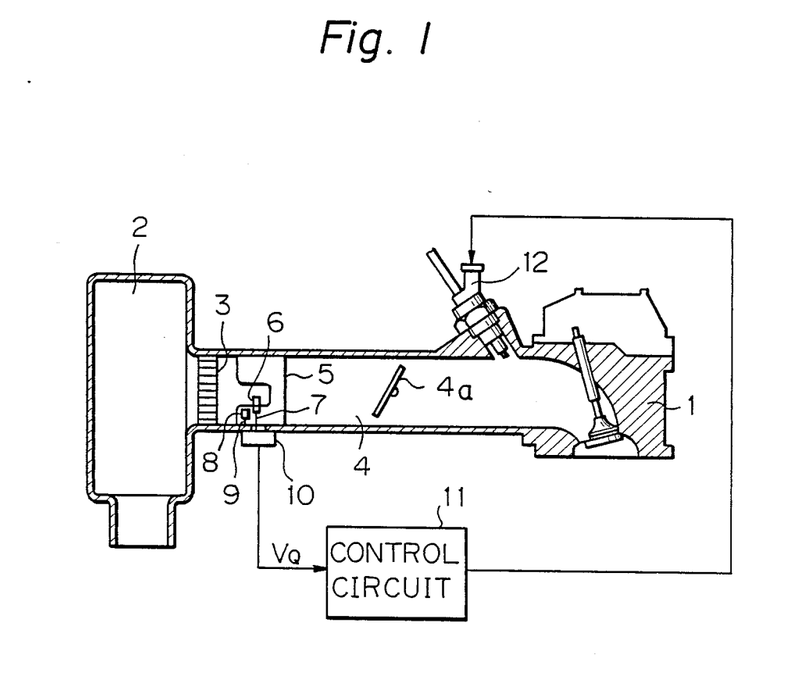
FIG. 1 is a schematic diagram showing the overall configuration of an internal combustion engine including a first embodiment of the direct-heated flow measuring apparatus according to the present invention.

In FIG. 1, which illustrates the overall configuration of an internal engine including a first embodiment of the flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 4a arbitrarily operated by a driver. The flow measuring apparatus is provided in the intake air passage 4 between the rectifier grid 3 and the throttle valve 4a.

The flow measuring apparatus includes a sensing portion inside of the intake air passage 4 and a sensor circuit 10 encapsulated in a hybrid board outside of the intake air passage 4. The sensing portion includes a supporting member 5 (such as aluminium) which supports a temperature-dependent resistor (film resistor) 6 in the intake air passage 4. The film resistor 6, which includes a heating and temperature-detecting portion, is connected via a flexible connection 7 to the sensor circuit 10. The supporting member 5 also supports a temperature-dependent resistor 8 for detecting the temperature of non-heated air in the intake air passage 4. The temperature-dependent resistor 8 is connected via a flexible connection 9 to the sensor circuit 10. Note that the temperature-dependent resistor 8 is disposed within the intake air passage 4 in such a way that the resistor 8 is not substantially affected by the heat generated from the film resistor 6, and there is no substantial fluctuation of the air stream against the film resistor 6.

The sensor circuit 10 controls the current flowing to the film resistor 6 to generate heat to provide a constant difference in temperature between the film resistor 6 and the temperature-dependent resistor 8. Also, the sensor circuit 10 generates and transmits an output voltage $V_Q$ to the control circuit 11, which includes, for example, a microcomputer. The control circuit 11 also receives various kinds of detecting signals such an engine speed signal Ne (not shown) and an engine coolant temperature signal THW (not shown) and controls the valve opening time period of a fuel injection valve 12 and the like.

Figure 2:
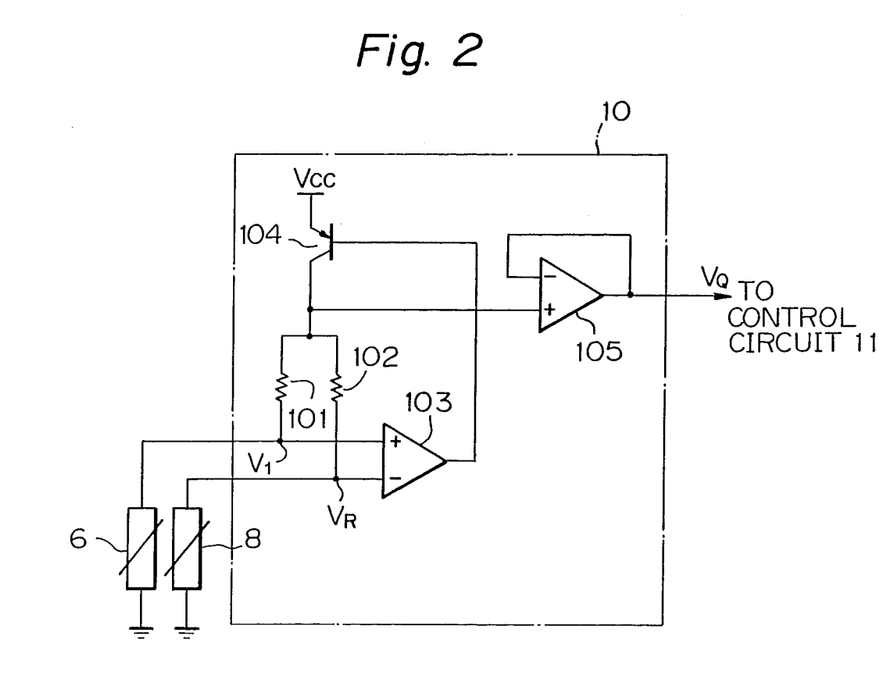
FIG. 2 is a circuit diagram of the sensor circuit of FIG. 1.

The sensor circuit 10 of FIG. 1 will be explained with reference to FIG. 2. In FIG. 2, the sensor circuit 10 includes resistors 101 and 102 which form a bridge circuit with the film resistor 6 and the temperature-dependent resistor 8; a comparator 103; a transistor 104 controlled by the comparator 103; and a voltage buffer 105. The sensor circuit 10 operates as follows. When the amount of air flowing through the intake air passage 4 increases, thus reducing the temperature of the film resistor 6, which is, in this case, a platinum resistor, the resistance value thereof decreases so as to satisfy the following condition:

$$V_1 \leq V_4$$

where $V_1$ is the potential at the node between the resistor 101 and the film resistor 6 and $V_R$ is the potential at the node between the reistor 102 and the temperature-dependent resistor 8. As a result, the output potential of the comparator 103 is reduced, thereby increasing the conductivity of the transistor 104. Therefore, the heat generated by the film resistor 6 is increased and, simultaneously, the collector potential of the transistor 104 is increased, so that the output voltage $V_Q$ of the voltage buffer 105 is also increased.

Contrary to this, when the amount of air flowing through the intake air passage 4 decreases, thus increasing the temperature of the film resistor 6, the resistance value thereof increases so as to satisfy the following condition:

$$V_1 > V_R.$$

As a result, the output potential of the comparator 103 is increased, thereby decreasing the conductivity of the transistor 104. Therefore, the heat generated by the film resistor 6 is decreased and, simultaneously, the collector potential of the transistor 104 is decreased, so that the output voltage $V_Q$ of the voltage buffer 105 is also decreased.

Thus, feedback control is performed upon the temperature of the film resistor 6 to provide a constant difference in temperature between the film resistor 6 and the temperature-dependent resistor 8, which, in this case, detects the temperature of the ambient air. Thus, the output voltage $V_Q$ of the output buffer 105 indicates the amount of air flowing through the intake air passage 4.

Figure 3:
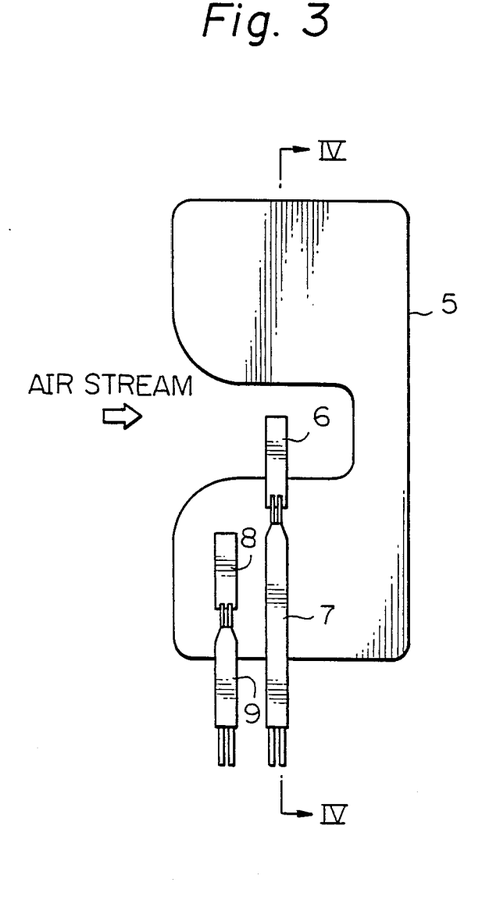
FIG. 3 is a plan view of the film resistor, the temperature-dependent resistor, and the supporting member of FIG. 1.
Figure 4:
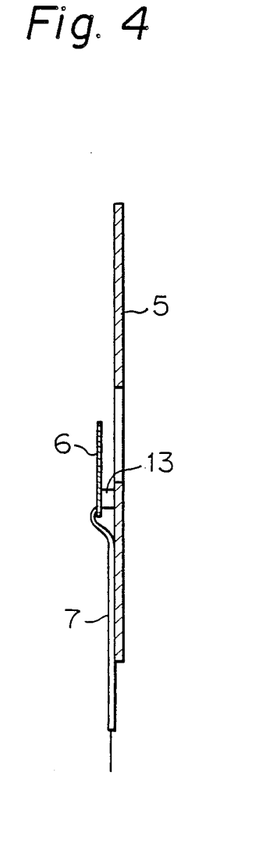
FIG. 4 is a cross-sectional view taken along the line IV—IV of FIG. 3.

FIG. 3 is an enlargement of FIG. 1 in the periphery of the film resistor 6, and FIG. 4 is a cross-sectional view taken along the line IV—IV. As illustrated in FIGS. 3 and 4, only one end of the film resistor 6 is supported by an adiabatic member 13 in the supporting member 5, so that the face thereof having a resistance pattern thereon is parallel to the air stream, i.e., the minimum dimension portion of the film resistor 6 is opposed to the air stream. Note that, if both of the ends of the film resistor 6 are fixed to the supporting member 5, the sensor output is changed by the strain gauge effect of the film resistor 6, i.e., the strain of the film resistor 6. The support of the film resistor 6 by only one end thereof avoids this strain gauge effect.

Also, each of the flexible connections, 7 and 9 are comprised of a conductor (such as Cu) having a pattern thereon sandwiched by two flexible insulating resin films, and therefore, have a structure resistant to erosion, disconnection, and the like, as compared with bonding wires.

Figure 5A:
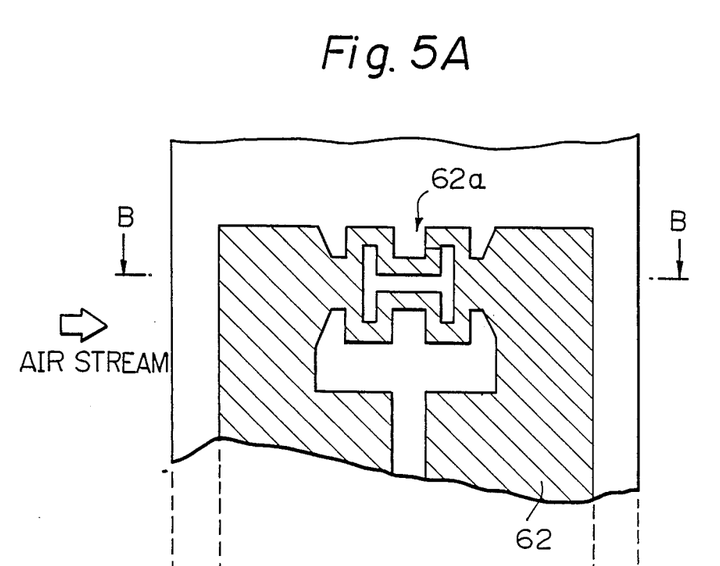
FIG. 5A is a partial plan view of the film resistor of FIG. 1.
Figure 5B:
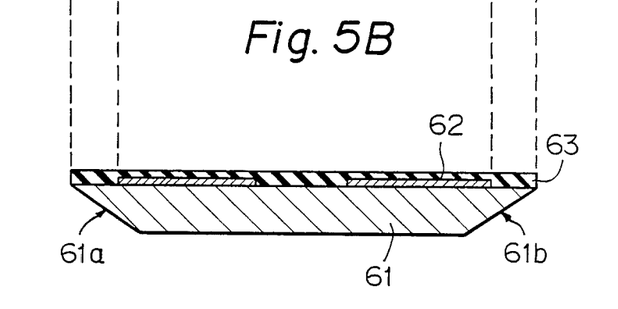
FIG. 5B is a cross-sectional view taken along the line B—B of FIG. 5A.

FIG. 5A is a partial enlargement of the film resistor 6 of FIG. 1, and FIG. 5B is a cross-sectional view taken along the line B—B of FIG. 5A. As illustrated in FIGS. 5A and 5B, the film resistor 6 comprises a monocrystalline silicon substrate 61, a platinum (Pt) resistance pattern layer 62, and a passivation layer ($SiO_2$ or $Si_3N_4$) 63 for protecting the Pt resistance pattern layer 62. Note that, in this case, the $SiO_2$ layer (not shown) obtained by thermally-oxidizing the substrate 61 is provided between the substrate 61 and the Pt resistance pattern layer 62. In the Pt resistance pattern layer 62, the portion 62a thereof having a particularly large resistance value serves not only as a heater by receiving a power supply, but also as a temperature-detecting portion by detecting a resistance value thereof.

According to the present invention, a taper 61a is provided on the upstream side of the substrate 61 of the film resistor 6, and a taper 61b is provided on the downstream side thereof. These tapers 61a and 61b are obtained by performing anisotropic etching upon the silicon monocrystalline substrate 61. For example, if the flat surface of the silicon monocrystalline substrate 61 is the face (100) or (110), the tapers 61a and 61b are the face (111). That is, the anistropic etching uses a difference in etching speed, i.e., the etching speed of the face (111) of monocrystalline silicon is very small compared with that of the face (100) or (110) thereof.

Thus, stagnation regions or boundary regions are avoided or suppressed on the upstream side of the film resistor 6 by the upstream-side taper 61a, and accordingly, the adhesion of suspended particles in the air stream ot the film resistor 6 is avoided or decreased by the upstream-side taper 61a. Also, if backfiring or valve overlap occur after acceleration, the adhesion of suspended particles to the film resistor 6 due to a blow back of the combustion gas is avoided or decreased, and simultaneously, the effects of impact waves on the sensor are reduced.

Although the above-mentioned tapers are obtained by the face (111) of polycrystalline silicon, they can be also obtained by performing a suitable mechanical process upon polycrystalline silicon.

Figure 6A:
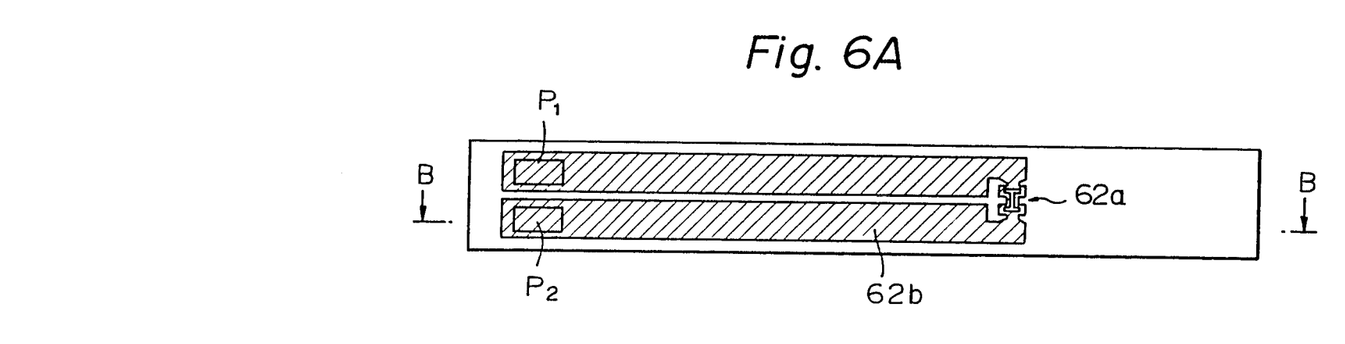
FIG. 6A is a plan view of the film resistor of FIG. 1.
Figure 6B:
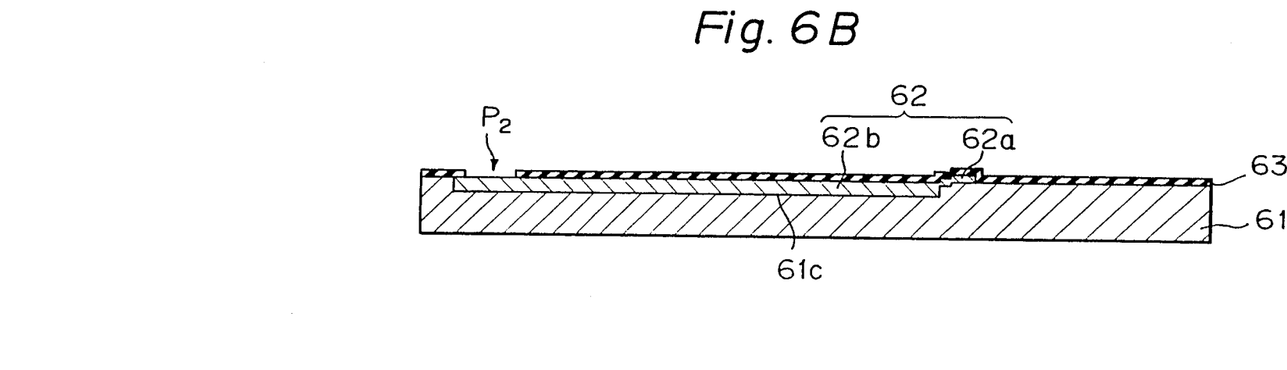
FIG. 6B is a cross-sectional view taken along the line B—B of FIG. 6A.

FIG. 6A is a plan view illustrating the entire film resistor 6 of FIG. 1, and FIG. 6B is a cross-sectional view taken along the line B—B of FIG. 6A. In FIGS. 6A and 6B, a recess 61c is formed in the silicon monocrystalline substrate 61, and the Pt resistance pattern layer 62 is formed in this recess 61c. Note that $P_1$ and $P_2$ are lead take-out portions.

Generally, it is preferable that the distance between the lead take-out portions $P_1$ and $P_2$ and the heater temperature-detecting portion 62a be large. For example, in the Pt resistance pattern layer 62, the resistance value of the heater 1 temperature-detecting portiion 62a is preferably about ten times as large as that of the lead portion 62b thereof. For this purpose, the width or thickness of the heater/temperature-detecting portion 62a may be reduced, although it is then difficult to obtain stable heat when the temperature of the heater/temperature detecting portion 62a is increased by applying a relatively low voltage thereto. On the other hand, the width or thickness of the lead portion 62b may be increased, but this reduces the adiabatic effect and the passivation layer 63 covering the lead portion 62b becomes relatively large, thus increasing the area to which suspended particles can adhere.

In FIGS. 6A and 6B, since the Pt resistance pattern layer 62, particularly, the lead portion 62b thereof, is formed in the recess 61a of the substrate 61, the resistance value of the lead portion 62b can be reduced and thus the distance between the heater/temperature-detecting portion 62a and the lead take-out portions $P_1$ and $P_2$ made large, i.e., the adiabatic effect of the heater/temperature-detecting portion 62a made large. Further, it is possible to reduce the thickness of the passivation layer 63 and to make it flat, thereby reducing the adhesion of suspended particles to the film resistor 6, particularly, to the passivation layer 63. Still further, the heat capacity (heat mass) of the airflow sensor can be reduced, thereby improving the heat dissipation characteristics, and thus, an excellent sensitivity and high response speed can be obtained.

Note that the heater/temperature-detecting portion 62a can be also provided in a recess of the substrate 61.

Figure 7:
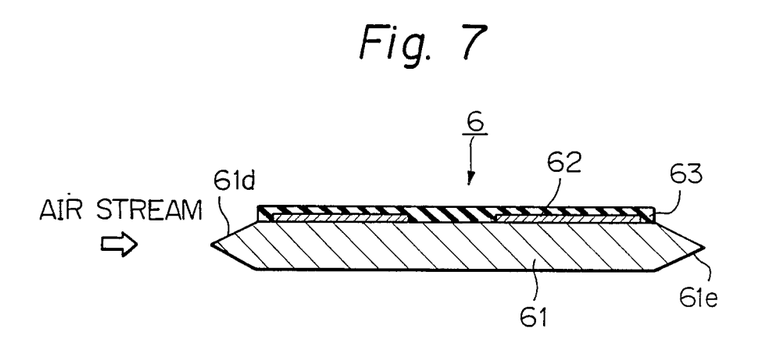
FIGS. 7 and 8 are modification of FIG. 5B.

In FIG. 7, which is a modification of FIG. 5B, wedge-shaped protrusions, i.e., V-shaped protrusions 61d and 61e, are formed on the upstream and downstream sides of the substrate 61. The protrusions 61d and 61e are also formed by performing anistropic etching upon both surfaces of the substrate 61 made of monocrystalline silicon. For example, if the face of the substrate on which the Pt resistance pattern layer 62 is formed and the back face thereof are the face (110), the edge angle of the protrusions 61d and 61e is approximately 70° C. Thus, the same effect as illustrated in FIG. 5B can be obtained. Particularly, in the protrusions 61d and 61e, if the length of an upper taper portion is the same as that of a lower taper portion, the reduction of fluid speed is minimum at the periphery of stagnation points at the edges of the protrusions 61d and 61e, which very effectively avoids the adhesion of suspended particles.

Figure 8:
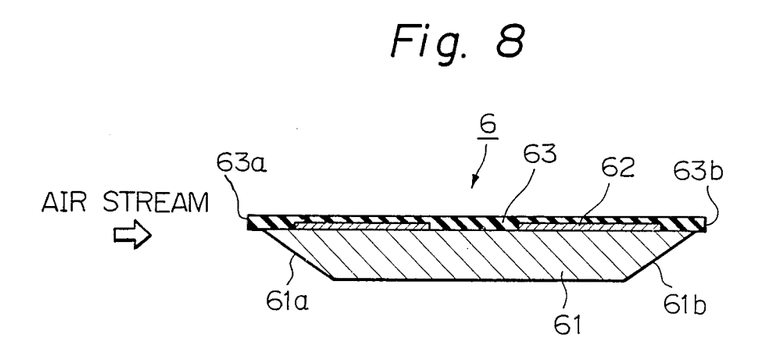

In FIG. 8, which is also a modification of FIG. 5B, the passivation layer 63 of the substrate 61 is protruded slightly from the edge portions at the upstream-side and downstream-side tapers 61b and 61c of the substrate 61. That is, the passivation layer 63 has two protrusions 63a and 63b. For example, where the face of the substrate 61 made of monocrystalline silicon on which the Pt resistance pattern layer 62 is formed is the face (111), and the tapers 61a and 61b are the face (100) or (110) haing a high etching speed by anisotropic etching, the protrusions 63a and 63b can be obtined by carrying out anistropic etching after the formation of the passivation layer 63.

In the configuration of FIG. 8, the formation of the protrusions 63a and 63b suppresses the adhesion of suspended particles, as compared with the configuration of FIG. 5B where the adhesion of suspended particles to the ends of the passivation layer 63 is so far advanced that such particles are adhered to the tapers 61b and 61c.

Also, in the configuration of FIG. 8, when the protrusions 63a and 63b protruded about 5 to 20 μm from the edges of the substrate 61, and the passivation layer 63 has a thickness of 1 to 2 μm, suspended particles are concentrated upon and adhered to the edges of the protrusions 63a and 63b, thereby avoiding the adhesion of suspended particles to the other portions. Also, since the protrusions 63a and 63b are thin, the adhesion of suspended particles thereto is very small. Further, since the passivation layer 63 is constructed by $SiO_2$ or $Si_3N_4$, the heat conductivity coefficient thereof is small, so that the effect on the characteristics of the adhesion of suspended particles can be reduced.

Figure 9:
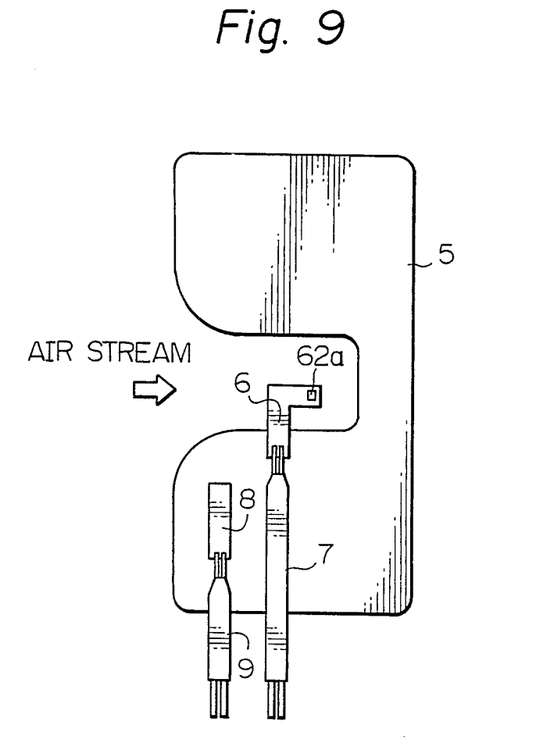
FIG. 9 is a plan view illustrating a second embodiment of the direct-heated flow measuring apparatus according to the present invention.

In FIG. 9, which illustrates a second embodiment of the present invention, the film resistor 6 is approximately "L"-shaped, and the heater/temperature-detecting portion 62a is formed on one end thereof. The surface of the film resistor 6 is parallel to the air stream in the same way as in the first embodiment, and in addition, the portion of the film resistor 6 on which the heater/temperature-detecting portion 62a is formed is parallel to the air stream and is directed to the downstream side. Note that, in the substrate of this film resistor 6, the faces thereof on the upstream and downstream sides are tapered in the same way as in the first embodiment, and that the lead portion, the passivation layer and the like are formed in the same way as in the first embodiment.

According to the second embodiment, since the stagnation region or boundary region does not exist in the periphery of the heater/temperature-detecting portion 62a, the adhesion of suspended particles to the periphery of the heater/temperature-detecting portion 62a is avoided or remarkably suppressed.

Also, even when suspended articles are adhered to the upstream side to the film resistor 6, such particles are adhered to a position of the film resistor 6 far away from the heater/temperature-detecting portion 62a, which is a main heat dissipating portion of the film resistor 6. As a result, even when the heat dissipation characteristics of the particles adhered portions are changed, this change of the heat dissipation characteristics is very small in view of the entire film resistor 6, so that the sensitivity and response speed are not effected.

Figure 10:
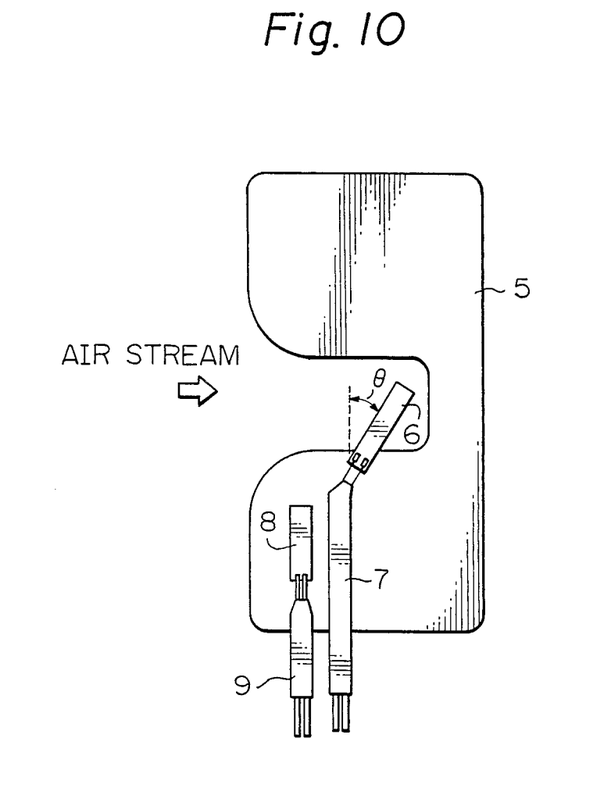
FIG. 10 is a plan view illustrating a third embodiment of the direct-heated flow measuring apparatus according to the present invention.

In FIG. 10, which illustrates a third embodiment of the present invention, the film resistor 6, which is rectangular, is supported by the supporting member 5 so that the thickness portion of the film resistor 6 opposing the air stream is sloped at a predetermined angle $\theta$.

According to the third embodiment, the faces of the film resistor 6 on upstream and downstream sides thereof are sloped without forming tapered portions in the substrate of the film resistor 6, thereby obtaining the same effect as in the first embodiment. Note that, if tapered portions are formed in the substrate in the same way as in the first embodiment, the adhesion of suspended particles can be further avoided.

Note that the above-mentioned predetermined angle $\theta$ is set so as to exhibit a sufficient adhesion preventing effect for suspended particles, and avoid a reduction of sensitivity due to the fluctuation of the air stream at the portion of the film resistor 6 fixed to the supporting member 5. According to the findings of the inventors, this angle $\theta$ is preferably 40° to 70°.

Note that, the present invention can be applied to flow rate sensors other than airflow rate sensors, such as liquid flow rate sensors. Further, the present invention can be applied to a digital (pulse) type flow rate sensor controlled by a trigger pulse. That is, in this sensor, when such a trigger pulse is given to initiate heating of a heater resistor, then the heating of the heater resistor continues until a constant difference in temperature between two temperature-dependent resistors is generated, or until the downstream temperature-dependent resistor reaches a constant value. In this case, the heating time period is detected as the mass flow rate of air of the volume flow rate of air. Such a trigger pulse control has an advantage in that the power dissipation is good. Note that such a trigger pulse control is possible in a direct-heated flow rate sensor.

As explained above, according to the present invention, the adhesion of suspended particles can avoided or reduced, therby improving the sensitivity and response speed of the sensor.

We claim:

1. A direct-heated flow measuring apparatus for measuring a flow rate within a passage comprising:
    a film resistor disposed wthin said passage, said film resistor comprising:
    a substrate having an upstream-side face sloped with respect to a fluid stream within said passage; and
    a resistance layer, formed on said substrate, having a portion for generating heat and detecting a temperature thereof, said resistnce layer including a passivation layer formed on said substrate and covering said resistance layer, said passivation layer is protruding toward the upstream side thereof from an upstream-side edge of said substrate;
    a supporting member for supporting said film resistor in said passage such that said resistance layer is in a plane which is approximately in parallel to a flow of said fluid stream; and
    electric power control means, connected to said film resistor, for controlling the heat generated therefrom.

2. A direct-heated flow measuring apparatus for measuring a flow rate within a passage comprising:
    a film resistor disposed within said passage, said film resistor comprising:
    a substrate having an upstream-side face sloped with respect to a fluid stream within said passage; and
    a resistance layer, formed on said substrate, having a portion for generating heat and detecting a temperature thereof, said resistance layer including a passivation layer formed on said substrate and cvering said resistance layer, said passivation layer protruding toward the downstream side thereof from a downstream-side edge of said substrate;
    a supporting member for supporting said film resistor in said passage such that said resistance layer is in plane which is approximately in parallel to a flow of said fluid stream; and
    electric power contol means, connected to said film resistor, for controlling the heat generated therefrom.

3. A direct-heated flow measuring apparatus for measuring a flow rate within a passage comprising:
    a film resistor disposed within said passage, said film resistor comprising:
    a substrate having an upstream-side face sloped with respect to a fluid stream within said passage and approximately of an "L"-shape, having a leg portion directed toward a downstream side thereof, and
    a resistance layer, formed on said substrate, having a portion for generating heat and detecting a temperature thereof, the heat-generating and temperature-detecting portion of said resistance layer being formed on the leg portion of said substrate;
    a supporting member for supporting said film resistor in said passage such that said resistance layer is in a plane which is approximately in parallel to a flow of said fluid stream; and
    electric power control means, connected to said film resistor, for controlling the heat generated therefrom.

4. A direct-heated flow measuring apparatus for measuring a flow rate of a fluid following a path within a passage comprising:
    a film resistor disposed within said passage, said film resistor comprising:
    a substrate which is substantially rectangular, having an upstream side sloped with respect to said path of said fluid within said passage;
    a resistance layer, formed on said substrate, having a portion for generating heat and detecting a temperature thereof; and
    a passivation layer, formed on said substrate, for covering said resistance layer,
    wherein said passivation layer protrudes towards the upstream-side thereof from an upstream-side edge of said substrate;

a supporting member for supporting said film resistor in said passage, such that said resistance is in a plane which is approximately in parallel to said fluid stream; and electric power control means, connected to said film resistor, for controlling the heat generated therefrom.

5. A direct-heated flow measuring apparatus for measuring a flow rate within a passage comprising:

a film resistor disposed within said passage, said film resistor comprising:

a substrate which is substantially rectangular, having an upstream-side face sloped with respect to a fluid stream within said passage and having a downstream-side face sloped with respect to said fluid stream;

a resistance layer, formed on said substrate, having a portion for generating heat and detecting a temperature thereof; and a passivation layer, formed on said substrate, for covering said resistance layer, wherein said passivation layer protrudes towards the downstream side thereof from a downstream-side edge of said substrate, a supporting member for supporting said film resistor in said passage, such that said resistance layer is in a plane which is approximately in parallel to said fluid stream; and electric power control means, connected to said film resistor, for controlling the heat generated therefrom.

6. A direct-heated flow measuring apparatus for measuring a flow rate within a passage comprising:

a substrate positioned in said passage at an angle $\theta$ with a plane that is perpendicular with respect to a fluid stream in said passage, where $0<\theta<90$, so that one end portion of said substrate is located upstream of another end portion of said substrate, and having at least one planar surface;

a resistance layer formed on said planar surface of said substrate and having a portion for generating heat and detecting a temperature thereof at said other end portion of said substrate;

a supporting member for fixedly supporting said one end portion of said substrate thereto such that said resistance layer is in a plane which is substantially in parallel to a flow of said fluid stream; and electric power control means, connected to said resistance layer, for controlling the heat generated from said resistance layer to thereby measure the flow rate.

7. A direct-heated flow measuring apparatus according to claim 6, further comprising:

an electrical connection structure, provided on said supporting member, for connecting said resistance layer to said electric power control means.

8. A direct-heated flow measuring apparatus according to claim 6, further comprising:

a passivation layer formed on said substrate and covering said resistance layer.

9. A direct-heated flow measuring apparatus according to claim 8, wherein an upstream-side face of said substrate is tapered.

10. A direct-heated flow measuring apparatus according to claim 6, further comprising:

a film resistor, provided on said support member at a portion upstream of said resistance layer and apart from said resistance layer, for detecting a temperature of said fluid stream.

11. A resistor assembly for a flow measuring apparatus, comprising:

a substrate adapted to be disposed in an area within which said flow is to be measured, said substrate having at least one planar face;

means for supporting said substrate in said area in a way such that:

(a) said planar face defines a plane which is substantially parallel to a plane defined by a direction of said flow to be measured, and (b) said substrate forms an angle $\theta$, $0<\theta<90°$, so that one end portion is upstream of another end portion with respect to a plane perpendicular to a direction of said flow so that one end portion is upstream of an other end portion; and a resistance layer, formed on said planar face at said other end portion, for generating heat to be used in measuring said flow, wherein said supporting means supports only said one end portion.

12. A resistor assembly as in claim 11, wherein said substrate is substantially rectangular.

13. An assembly as in claim 12, wherein said tilt of said planar face is at an angle $\theta$ between a perpendicular to said flow and said planar face, and which is between 40° and 70°.

* * * * *